United States Patent [19]

Yoshino

[11] 4,356,726
[45] Nov. 2, 1982

[54] APPARATUS FOR DETECTING GRADE OF VEHICLE FROM ATMOSPHERIC PRESSURE DIFFERENCE

[75] Inventor: Yasuhisa Yoshino, Okazaki, Japan

[73] Assignee: Nippon Soken, Inc., Nishio, Japan

[21] Appl. No.: 211,939

[22] Filed: Dec. 1, 1980

[30] Foreign Application Priority Data

Dec. 7, 1979 [JP] Japan ................... 54-159603

[51] Int. Cl.$^3$ .............................................. G01C 21/00
[52] U.S. Cl. .................................... 73/178 R; 33/366;
73/146
[58] Field of Search ................. 73/178 R, 178 T, 146;
33/366

[56] References Cited

U.S. PATENT DOCUMENTS 3,378,932 4/1968 Neill ........................................ 33/366
4,302,973 12/1981 Yoshino et al. ................... 73/178 T

FOREIGN PATENT DOCUMENTS 52-23964 2/1977 Japan .................................... 33/366

*Primary Examiner*—Donald O. Woodiel
*Attorney, Agent, or Firm*—Cushman, Darby & Cushman

[57] ABSTRACT

Two hermetically sealed chambers alternately hold the atmospheric pressure in response to a timing pulse generated each time a vehicle travels a predetermined distance. The difference between the atmospheric pressures held in the sealed chambers is detected by a semiconductor pressure sensor disposed between the sealed chambers. Two sample and hold circuits alternately sample and holds the detection output of the semiconductor pressure sensor in response to the timing pulse. A comparison circuit compares the hold outputs of the sample and hold circuits to generate an output corresponding to the difference or the grade of the vehicle. If necessary, the output of the comparison circuit is converted to a pulse signal having a pulse time width corresponding to the output.

4 Claims, 9 Drawing Figures

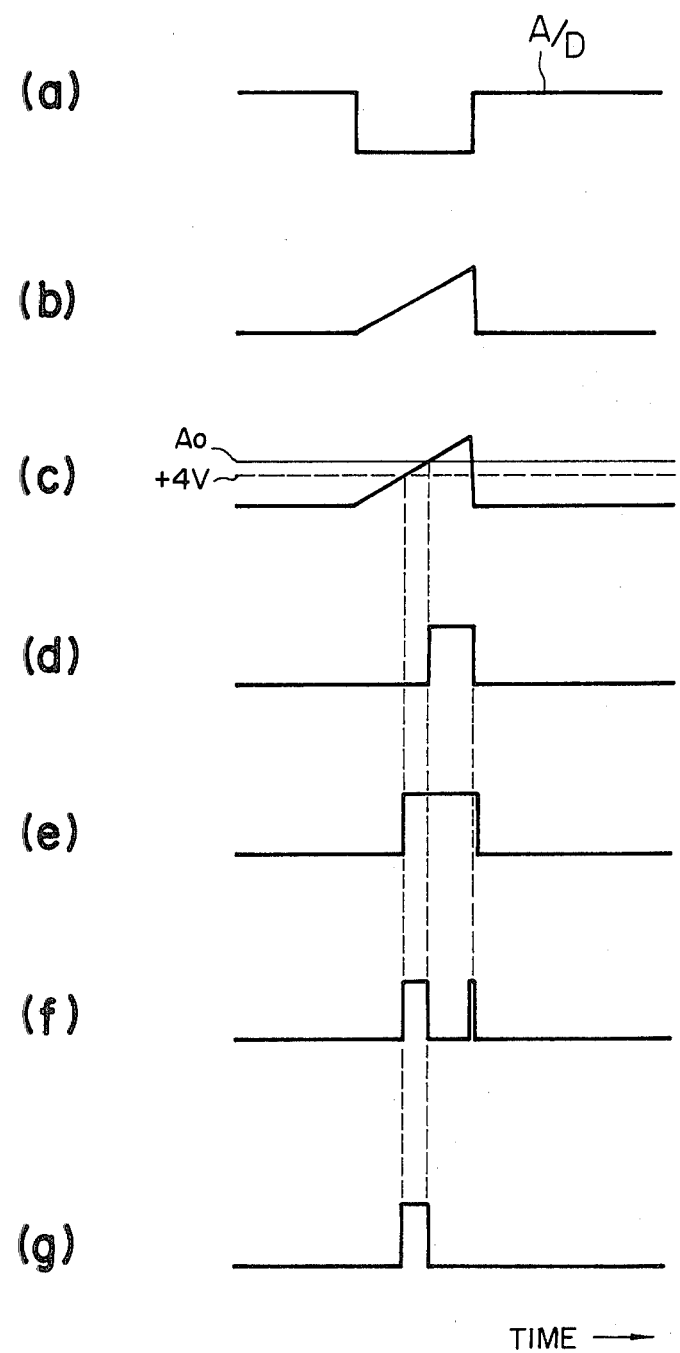

APPARATUS FOR DETECTING GRADE OF VEHICLE FROM ATMOSPHERIC PRESSURE DIFFERENCE

BACKGROUND OF THE INVENTION

The present invention relates to a grade detecting apparatus for vehicles, which detects from the atmospheric pressure difference the grade of a road on which the vehicle is running.

Known measuring apparatus are of mechanical construction so that the apparatus include for example a weight whose vertical line is used as a reference line to detect the grade of a vehicle, and thus there is a disadvantage that during the running of the vehicle the grade of the road cannot be measured accurately due to the vibrations as well as the forward and backward accelerations of the vehicle and it is also impossible to accurately measure the grade if the vehicle is inclined due to the goods carried by the vehicle or the occupants.

SUMMARY OF THE INVENTION

With a view to overcoming the foregoing deficiencies in the prior art, it is the object of the present invention to provide a grade measuring apparatus for vehicles, which is free from any error due to the vibrations as well as the longitudinal accelerations of a running vehicle, is less subjected to the effect of electric noise and thus is capable of accurately measuring the grade of the running vehicle.

The present invention stems from the recognition of the fact that the atmospheric pressure changes with altitude (e.g., the atmospheric pressure decreases by about 1.2 mbar for every increase of 10 m in the altitude), and to accomplish the above object the present invention preferably includes a pair of sealed chambers adapted to be brought into and out of communication with the atmosphere by electromagnetic valves to alternately hold therein the atmospheric pressure in two sections traveled and to detect the atmospheric pressure difference between the sections, and two sample and hold circuits for alternately sampling and holding the pressure difference representative signals, whereby determining the grade of the vehicle in accordance with the comparison result of the values held by the sample and hold circuits and the distance of the two sections.

BRIEF DESCRIPTION OF THE DRAWINGS

FIG. 8 illustrates a plurality of waveforms generated at the various parts in the A/D converting part of FIG. 7.

DESCRIPTION OF THE PREFERRED EMBODIMENT

The present invention will now be described in greater detail with reference to the illustrated embodiment.

Figure 1:
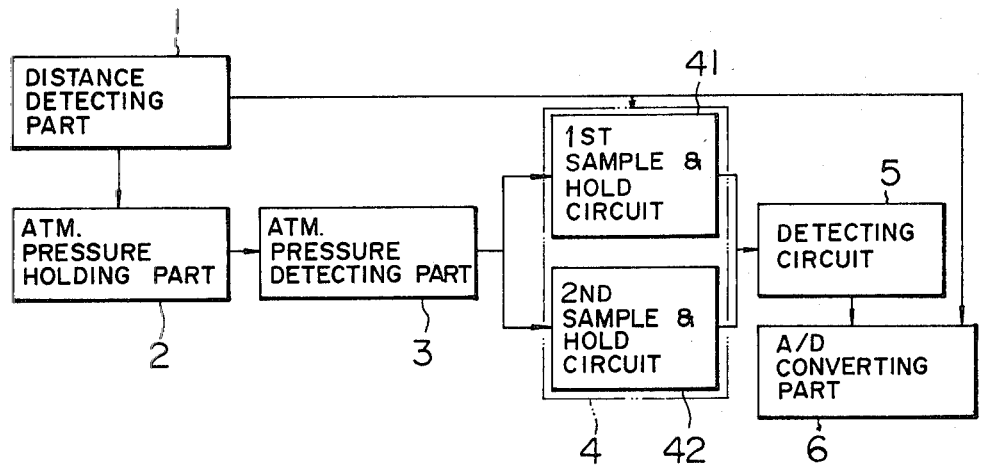
FIG. 1 is a block diagram showing the overall construction of an embodiment of the present invention.

Referring to FIG. 1 showing the overall construction of an embodiment of the present invention, numeral 1 designates a distance detecting part forming a means for detecting the distance traveled by a vehicle, 2 an atmospheric pressure holding part forming an atmospheric pressure holding means for alternately holding the atmospheric pressure in two sealed chambers each time the vehicle travels a predetermined distance, and 3 an atmospheric pressure detecting part forming an atmospheric pressure detecting means for detecting the difference between the two atmospheric pressures held in the atmospheric pressure holding part. Numeral 4 designates a sample and hold means comprising first and second sample and hold circuits 41 and 42 for alternately holding the pressure signal of the atmospheric pressure detecting part 3 in response to the traveled distance signal generated from the distance detecting part 1 each time the vehicle travels a predetermined distance. Numeral 5 designates a detecting circuit forming a comparison means for detecting the difference between the outputs of the first and second sample and hold circuits 41 and 42, and 6 an A/D converting part responsive to the output signal of the detecting circuit 5 for generating a signal representative of the sign of an upgrade or downgrade and a pulse signal having a pulse width corresponding to the grade.

Figure 3:
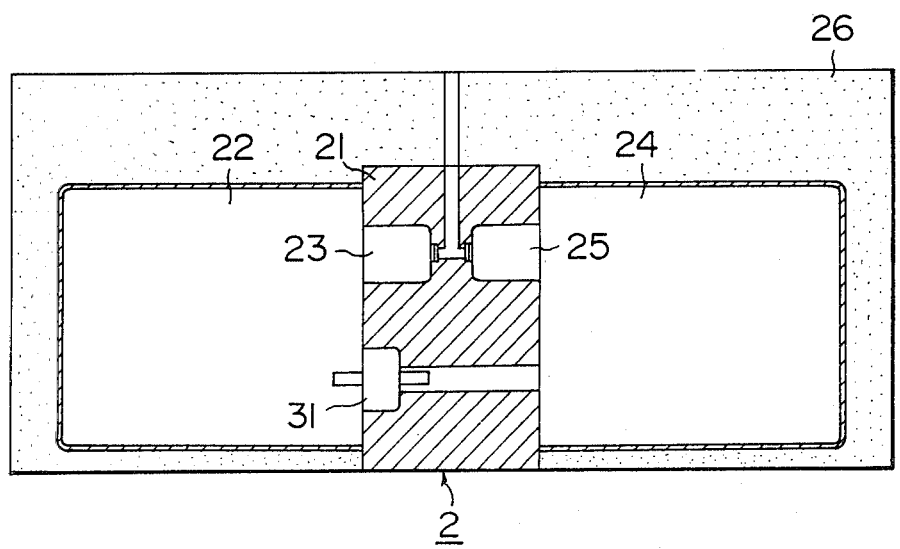
FIG. 3 is a partial sectional view showing the construction of the atmospheric pressure holding part shown in FIG. 1.
Figure 2:
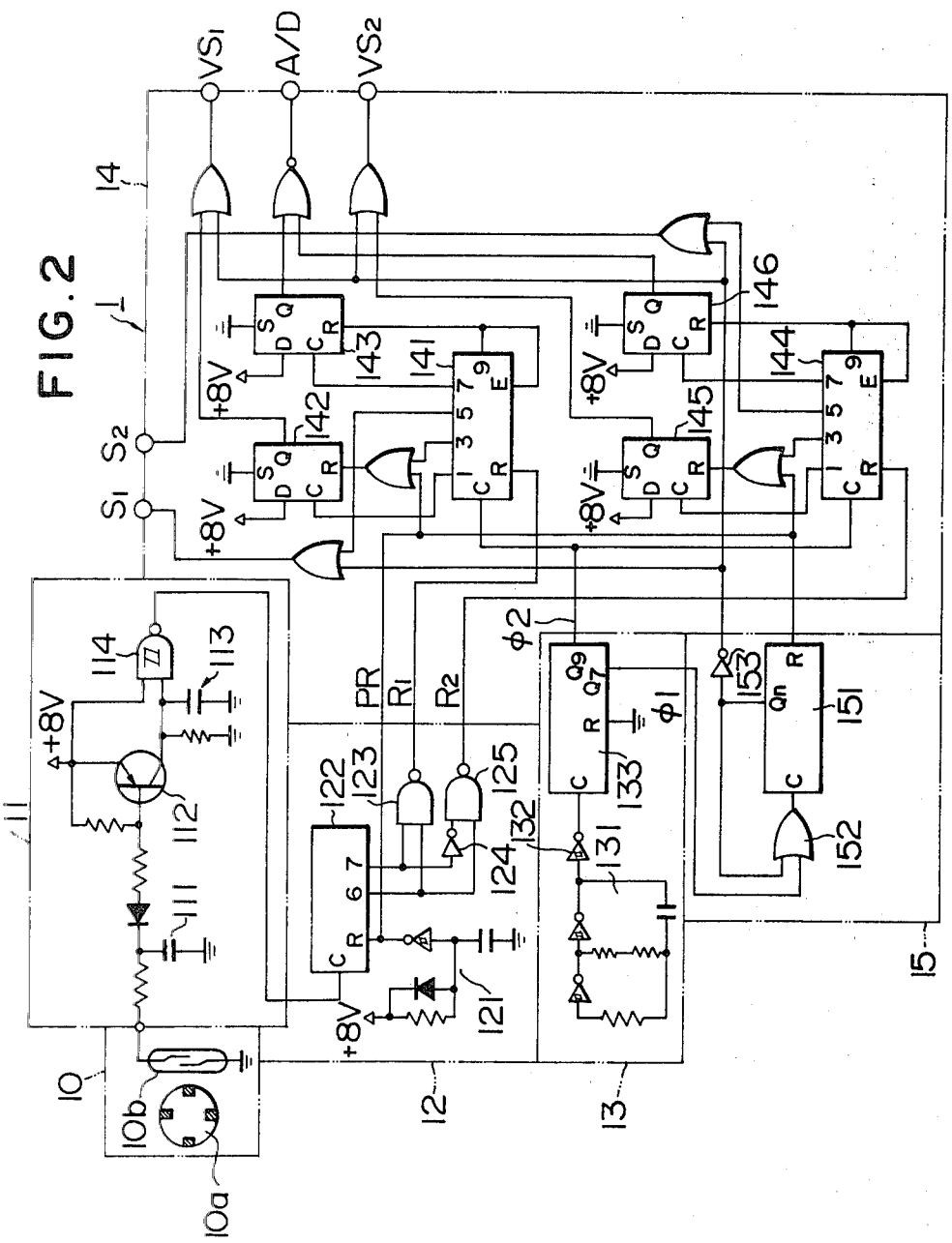
FIG. 2 is a circuit diagram showing the distance detecting part of FIG. 1.

The operation of the embodiment as well as the individual circuits will now be described with reference to FIGS. 2, 4, 5 and 7 showing the detailed circuit diagrams of FIG. 1, FIG. 8, FIG. 3 showing the construction of the atmospheric pressure holding part 2 and FIGS. 6A and 6B explaining the operating principle of the invention. Referring to FIG. 2 showing the distance detecting part 1, numeral 10 designates a distance sensor comprising a magnet 10a attached to the speedometer cable shaft to rotate with the rotation of the vehicle wheel and a reed switch 10b adapted to generate for every rotation of the magnet 10a four pulse signals each corresponding to about 0.4 m traveled by the vehicle. Numeral 11 designates a reshaping circuit for reshaping the signal from the distance sensor 10, and it comprises a noise absorbing capacitor 111, a reshaping transistor 112, a noise filter circuit 113, a NAND gate 114 having a hysteresis characteristic or a Schmitt trigger circuit, etc. Numeral 12 designates a reset signal generating circuit for counting the vehicle travel distance representative pulse signals reshaped by the reshaping circuit 11 so as to alternately generate reset signals $R_1$ and $R_2$ for every 25.6 m (corresponding to 64 pulses) and for generating a power reset signal PR upon connection to the power source, and the circuit comprises a counter 122 using the known IC TC4024 manufactured by Tokyo Shibaura Electric Co., Ltd (hereinafter referred to as the TOSHIBA), a power reset circuit 121, an inverter 124 and NAND gates 123 and 125. Numeral 13 designates a clock signal generating circuit for supplying clock signals to the system, and the circuit comprises a CR oscillator 131 of the known construction, a reshaping NAND gate 132 having a hysteresis characteristic and a frequency dividing counter 133 using the TOSHIBA IC TC 4040. The counter 133 generates a 160 Hz clock signal $\phi_1$ from its seventh stage $Q_7$ and a 40 Hz clock signal $\phi_2$ from its ninth stage $Q_9$. Numeral 14 designates a control signal generating circuit responsive to the signals PR, $R_1$, $R_2$ and $\phi_2$ from the reset signal generating circuit 12 and the clock signal generating circuit 13 for generating sample and hold signals $S_1$ and $S_2$, valve drive signals $VS_1$ and $VS_2$ and an A/D conversion signal A/D, and the circuit comprises counters 141 and 144 each using the TOSHIBA IC TC4017, D-type latches 142, 143, 145 and 146 and a plurality of gates. When the reset signal $R_1$ is applied to the counter 141, the counter 141 generates pulse signals of 50 msec pulse spacing from its first stage 1, third stage 3, fifth stage 5 and seventh stage 7 in this order so that in cooperation with the D-type latches 142 and 143 the counter 141 first generates a valve drive signal $VS_1$ for 50 msec, then a sample and hold signal $S_1$ for 25 msec and then an A/D conversion signal A/D for 50 msec in this sequence, and the counter 141 completes its first series of operations when its ninth stage 9 goes to a "1" level. When the vehicle travels 25.6 m from that time, the reset signal generating circuit 12 generates a reset signal $R_2$ and then the counter 144 and the D-type latches 145 and 146 operate in the same manner as mentioned previously, thus first generating a valve drive signal $VS_2$ for 50 msec, then a sample and hold signal $S_2$ for 25 msec and then an A/D conversion signal A/D for 50 msec in this sequence and thereby completing its second series of operations. Thereafter, the above-mentioned two series of operations are repeated at intervals of 25.6 m traveled by the vehicle. Numeral 15 designates a valve resetting circuit for making the atmospheric pressures in the two sealed chambers equal to each other when the vehicle key switch is turned on, that is, when the power reset signal PR is applied to the circuit, the sample and hold signals $S_1$ and $S_2$ and the valve drive signals $VS_1$ and $VS_2$ are generated for about 1 second, and it comprises a counter 151 using the TOSHIBA IC TC4040, an OR gate 152 and an inverter 153.

FIG. 3 is a partial sectional view showing the construction of the atmospheric pressure holding part 2. In the Figure, numeral 21 designates a chassis made from aluminum or the like in which various component parts are enclosed, 22 a first sealed chamber, 23 a first electromagnetic valve for connecting and disconnecting the first sealed chamber with the atmosphere, 24 a second sealed chamber, and 25 a second electromagnetic valve for connecting and disconnecting the second sealed chamber 24 with the atmosphere. Disposed between the first and second sealed chambers 22 and 24 is a semiconductor pressure sensor which will be described later and the first and second sealed chambers are sealed completely from each other to prevent pressure leakage. Numeral 26 designates an expanded styrol heat insulator enclosing the entire atmospheric pressure holding part.

In operation, the valve drive signal $VS_1$ opens the first electromagnetic valve 23 for 50 msec so that the pressure in the first sealed chamber 22 becomes equal to the atmospheric pressure at that point on the road and then the valve 23 is closed. Then, as the vehicle travels 25.6 m further, the valve drive signal $VS_2$ is now applied to the second electromagnetic valve 25 which in turn is opened for 50 msec so that the pressure in the second sealed chamber 24 becomes equal to the atmospheric pressure at that point and then the valve 25 is closed. Thereafter, the atmospheric pressures at further points are alternately stored in the first and second sealed chambers 22 and 24 in this sequence at intervals of 25.6 m traveled. The entire atmospheric pressure holding part 2 is enclosed by the expanded styrol, thus making it less susceptible to the effect of external temperature changes.

Figure 4:
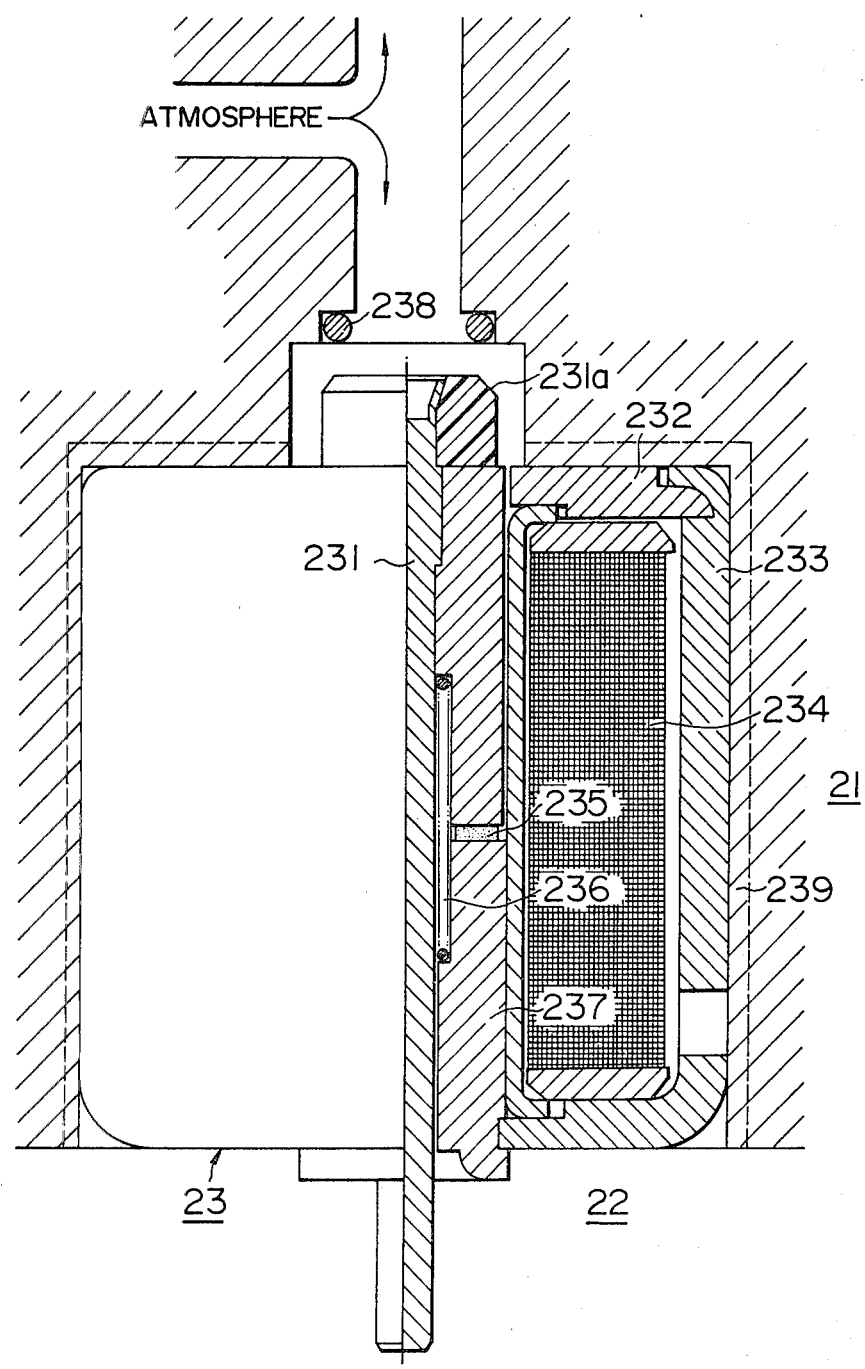
FIG. 4 is a partial sectional view showing the construction of the first electromagnetic valve shown in FIG. 3.

In FIG. 4 illustrating a partial sectional view of the first electromagnetic valve 23 (identical in construction with the second electromagnetic valve 25), numeral 231 designates a stainless steel moving core including a resin portion 231a at its one end. Numeral 232 designates an iron core plate, and 233 an iron coil housing to which the core plate 232 is secured by caulking. Numeral 234 designates a coil which when energized pulls the moving core 231 downward as shown in FIG. 4 and thus the first sealed chamber 22 is communicated with the atmosphere through a groove 239. Numeral 235 designates a rubber spacer, and 236 a spring having a restoring force which when the coil 234 is deenergized presses the moving core 231 against an O-ring 238 to disconnect the first sealed chamber 22 with the atmosphere. Numeral 237 designates an iron stator core, and 239 the groove formed in the chassis 21 to permit the flow of air therethrough as mentioned previously.

Figure 5:
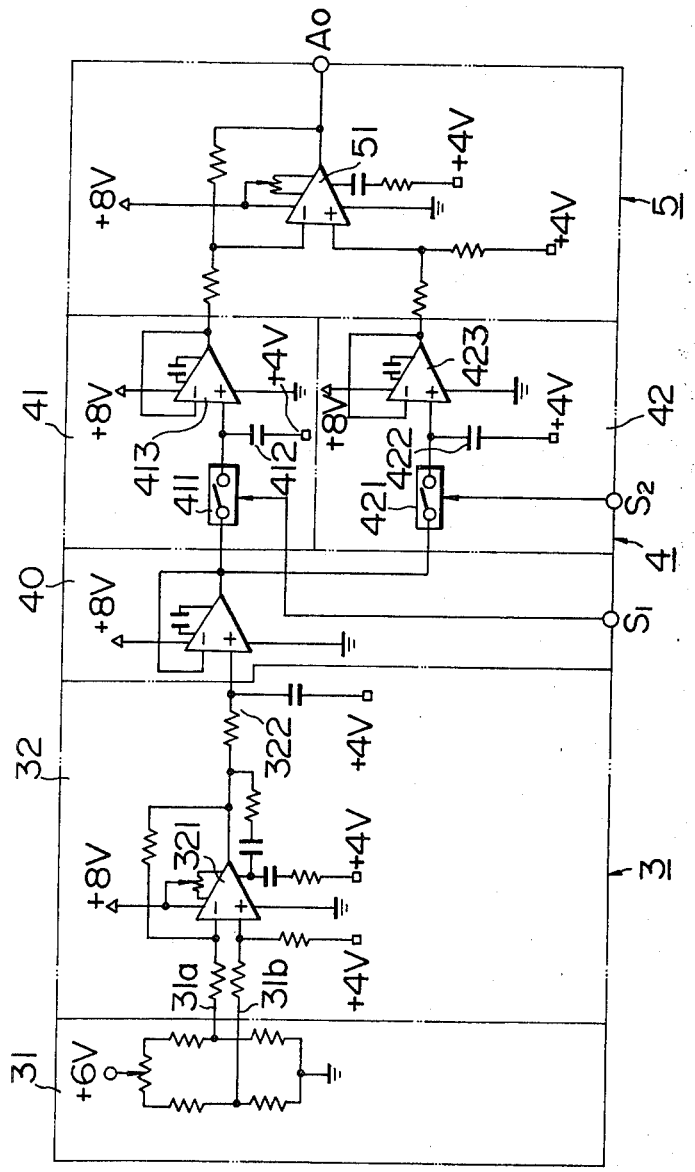
FIG. 5 is a circuit diagram showing the atmospheric pressure detecting part, the sample and hold means and the detecting circuit of FIG. 1.

FIG. 5 shows the atmospheric pressure detecting part 3, the first sample and hold circuit 41, the second sample and hold circuit 42 and the detecting circuit 5. A pressure sensor 31 comprising a known type of diaphragm-type semiconductor pressure sensor is so designed that the first and second sealed chambers 22 and 24 are separated from each other by a diaphragm whose displacement is detected by a bridged pressure-resistance transducer and a voltage proportional to the atmospheric pressure difference is produced across output terminals 31a and 31b. The small output voltage of the pressure sensor 31 is amplified by a differential amplifier circuit 321 comprising the Fairchild IC $\mu$A725 and noise is removed from the amplified voltage by an RC filter 322. The resulting signal is applied to a voltage follower circuit 40 from which the signal is selectively applied to the first and second sample and hold circuits 41 and 42 respectively including capacitors 412 and 422 and operational amplifiers 413 and 423 (the RCA IC CA3130) through their analog switches 411 and 421 (e.g., the TOSHIBA IC TC4066) in response to the sample and hold signals $S_1$ and $S_2$. The output voltage of the atmospheric pressure detecting part 3 is alternately held at intervals of 25.6 m traveled by the first sample and hold circuit 41 responsive to the sample and hold signal $S_1$ and the second sample and hold circuit 42 responsive to the sample and hold signal $S_2$. The atmospheric pressure signals held by the first and second sample and hold circuits 41 and 42 are respectively applied to the inverting and noninverting input terminals of a differential amplifier circuit 51 (the Fairchild IC $\mu$A725) in the detecting circuit 5 and the resulting amplified difference signal is generated at its output terminal. This difference signal or output voltage $A_0$ is proportional to the difference in altitude between two points which are apart by 25.6 m or the grade between the two points on the road.

The foregoing will now be discussed again with reference to FIGS. 6A and 6B. As mentioned previously, immediately after opening of the first electromagnetic valve 23 the output of the atmospheric pressure holding part 3 is held by the first sample and hold circuit 41 and immediately after opening of the second electromagnetic valve 25 the output of the atmospheric pressure holding part 3 is held by the second sample and hold circuit 42. For instance, assuming that the output characteristic of the semiconductor pressure sensor 31 used is as shown by the solid line in FIG. 6A, consider the case in which the vehicle goes up and down a monotonous slope. Assume that in FIG. 6B the distance between points $D_0$ to $D_4$ and $D_5$ to $D_9$ is the same 25.6 m and that the atmospheric pressure difference between the points is represented by a. The first electromagnetic valve 23 is opened at the point $D_0$ and the pressure in the first sealed chamber 22 becomes P. Then, the second electromagnetic valve 25 is opened at the point $D_1$ and the pressure in the second sealed chamber 24 becomes $(P-a)$. Thus, the pressure difference between the sealed chambers becomes a and the output voltage of the atmospheric pressure detecting part 3 becomes $b_1$ from FIG. 6A. If $V_0$ represents the voltage held by the first sample and hold circuit 41 at the point $D_0$, since $b_1$ represents the voltage held by the second sample and hold circuit 42 at the point $D_1$, the output of the detecting circuit 5 is given by $$\alpha(b_1 - V_0)$$

where $\alpha$ is a constant. When the first electromagnetic valve 23 is opened again at the point $D_2$, the pressure in the first sealed chamber 22 becomes $(P-2a)$ and the pressure difference between the sealed chambers becomes $-a$. Thus, the output of the atmospheric pressure detecting part 3 becomes $-b_2$ from FIG. 6A and the output of the detecting circuit 5 is given by $$\alpha\{b_1 - (-b_2)\} = \alpha(b_1 + b_2)$$

The same applies to the distance between the points $D_3$ and $D_4$ and the output of the detecting circuit 5 becomes $\alpha(b_1 + b_2)$. If the point $D_0$ is also a point on the slope, then $V_0 = -b_2$ and the output of the detecting circuit 5 becomes $\alpha(b_1 + b_2)$. The points $D_5$ to $D_9$ on the downward slope can be considered in the similar way so that when the first electromagnetic valve 23 is opened at the point $D_5$, the pressure in the first sealed chamber 22 becomes q. Thus, if $V_0'$ represents the voltage held by the first sample and hold circuit 41 just after the point $D_5$, then the output of the detecting circuit 5 at the point $D_6$ having the atmospheric pressure difference a is given by $$\alpha(-b_1 - V_0')$$

At the point $D_7$, the output becomes $\alpha(-b_1 - b_2) = -\alpha(b_1 + b_2)$, and similarly for the points $D_8$ and $D_9$ the output is given by $$-\alpha(b_1 + b_2)$$

Figure 6A:
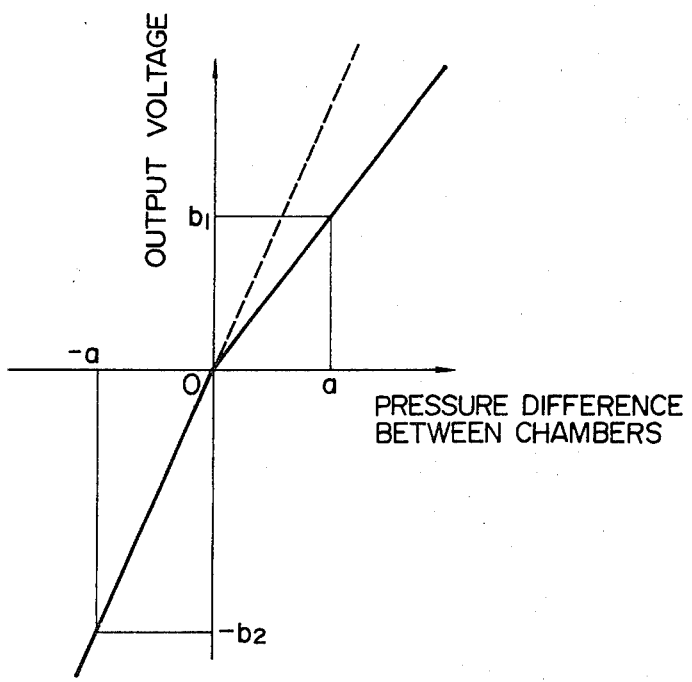
FIGS. 6A and 6B are diagrams which are useful for explaining the operation of the present invention.
Figure 6B:
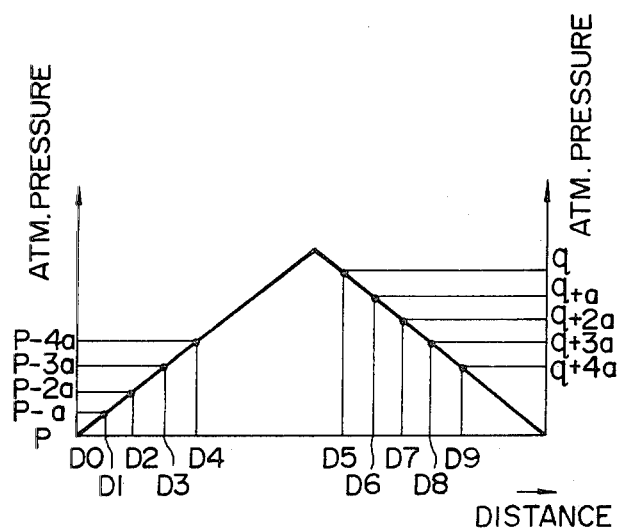

It will be seen from the foregoing that even if the output of the semiconductor pressure sensor 31 differs depending on the direction of pressure application as shown in FIG. 6A, in accordance with the system of this invention the same gain is ensured on an upgrade as well as on a downgrade.

Figure 7:
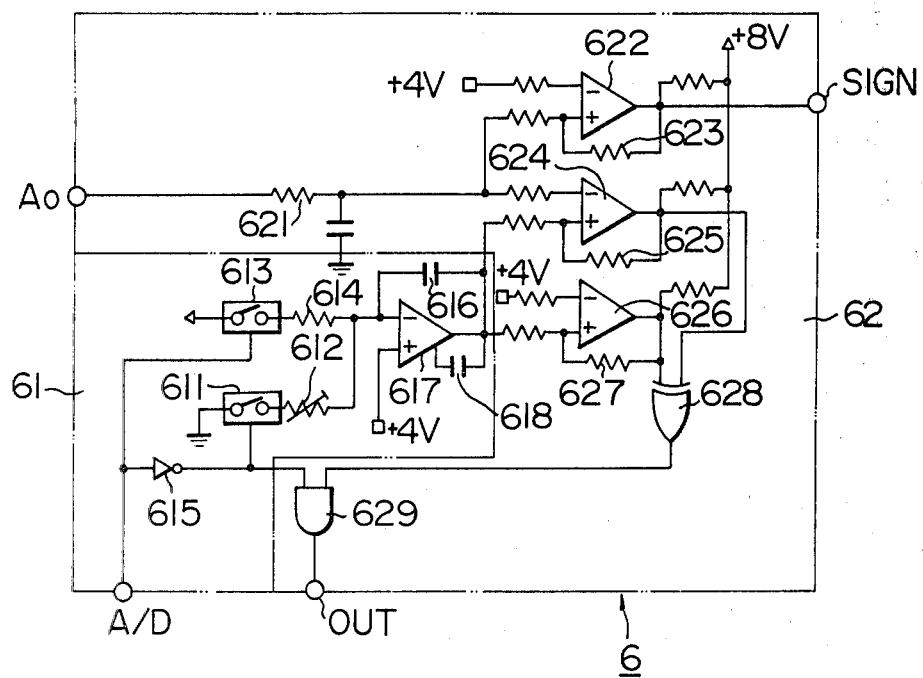
FIG. 7 is a circuit diagram showing the A/D converting part of FIG. 1.

In FIG. 7 showing the A/D converting part 6, numeral 61 designates a sawtooth wave generating circuit comprising analog switches 611 and 613 each using the TOSHIBA IC TC4066, resistors 612 and 614, capacitors 616 and 618, an operational amplifier 617 using the RCA IC CA3130 and an inverter 615. Thus, when the A/D conversion signal A/D goes to a "0" level as shown in (a) of FIG. 8, the analog switch 611 is turned on and the capacitor 616 is charged through the resistor 612. On the contrary, when the A/D conversion signal A/D goes to the "1" level, the analog switch 613 is turned on and the capacitor 616 discharges through the resistor 614. The resistance of the resistor 614 is very small as compared with the resistor 612 and thus the output of the operational amplifier 617 has a sawtooth waveform as shown in (b) of FIG. 8. Numeral 62 designates a converting circuit for determining the sign indicative of an upgrade or downgrade and for converting the analog voltage to a pulse width, and the circuit comprises a CR filter 621, comparators 622, 624 and 626 each using the Motorola IC MC3302, hysteresis resistors 623, 625 and 627, an exclusive OR gate 628 and an AND gate 629. The CR filter 621 removes the noise from the output voltage $A_0$ of the detecting circuit 5 and the resulting voltage is applied to the comparators 622 and 624. The comparator 622 compares the voltage $A_0$ with +4 V to determine the sign indicative of an upgrade or downgrade. The comparator 624 compares the voltage $A_0$ with the sawtooth wave and generates a pulse signal of a width corresponding to the voltage $A_0$ as shown in (c) and (d) of FIG. 8. The comparator 626 compares the sawtooth wave with +4 V and generates a reference pulse indicative of the condition having no pressure variation as shown in (c) and (e) of FIG. 8. The exclusive OR compares the reference pulse width with the width of the pulse signal corresponding to the output voltage $A_0$ and generates a pulse signal of a width proportional to the net atmospheric pressure difference as shown in (f) of FIG. 8. This signal is generated through the AND gate 629 as shown in (g) of FIG. 8.

As a result, the signal having a pulse width proportional to the grade is generated at a terminal OUT in FIG. 7 and the signal of "1" or "0" level corresponding to the sign of upgrade or downgrade is generated at a terminal SIGN in FIG. 7.

Since the apparatus of this invention generates a sign indicative of an upgrade or downgrade and a pulse signal having a width proportional to the grade, by the following signal processing the grade can be indicated digitally or on a meter, bar graph or the like as desired.

Further, to lessen the effect of external noise (e.g., wind or approaching vehicle), it is possible to use the average value of a plurality of measurements, thus very greatly increasing the stability as a data.

Still further, many other methods of the A/D conversion may be considered in addition to the one used in the above-described embodiment. For instance, any of the commercially available A/D converting devices can be used or alternatively the A/D conversion may be eliminated so as to directly use the analog data.

Still further, any suitable materials other than expanded styrol can be used for the heat insulator or alternatively any suitable device for maintaining the temperature constant may for example be added.

I claim:

1. An apparatus for detecting a grade traversed by a vehicle from atmospheric pressure difference comprising:

means for detecting a travelling distance of a vehicle to generate an output signal at every predetermined travelling distance of the vehicle;

means connected to said distance detecting means and having two chambers, for holding the atmospheric pressure in alternate one of the two chambers in response to the output signal of said distance detecting means;

means connected to said atmospheric pressure holding means, for detecting a pressure difference between the two chambers to generate an output signal;

sample and hold means connected to said pressure difference detecting means and said distance detecting means and having two sample and hold circuits, for sampling and holding the output signal of said pressure difference detecting means in alternate one of the two sample and hold circuits in response to the output signal of said distance detecting means; and means connected to said sample and hold means, for comparing output signals held by said two sample and hold circuits to generate an output signal representative of a grade traversed by said vehicle.

2. An apparatus according to claim 1, wherein said atmospheric pressure holding means further includes:

two electromagnetic valves each provided for each of said two chambers, for preventing the atmospheric from being introduced in the respective chambers; and a heat-insulating member covering over said chambers.

3. An apparatus according to claim 1, wherein said pressure difference detecting means includes a semiconductor pressure sensitive element disposed between said two chambers.

4. An apparatus according to claim 2, wherein said distance detecting means includes:

distance sensor means for producing pulses in synchronism with the rotation of a wheel of said vehicle;

a circuit connected to said distance sensor means, for counting the pulses from said distance sensor means to generate output pulses when it counts a predetermined value; and a control signal generating circuit connected to said counting circuit, for generating output signals for selectively actuating said electromagnetic valves.

* * * * *